3,356,475
METHOD OF PROTECTING THE SURFACE OF THE MOLTEN METAL IN A GLASS FLOTATION OPERATION
David Gordon Loukes, Eccleston Park, Prescot, and Albert Sidney Robinson, Birkdale, Southport, England, assignors to Pilkington Brothers Limited, Liverpool, England, a corporation of Great Britain
No Drawing. Filed Sept. 18, 1963, Ser. No. 309,884
Claims priority, application Great Britain, Sept. 20, 1962, 35,902/62
6 Claims. (Cl. 65—26)

This invention relates to the manufacture of flat glass.

In the manufacture of flat glass in ribbon form during which the glass is supported on a bath of molten metal, for example molten tin or a tin alloy having a specific gravity greater than glass, in order to protect the bath surface which is exposed at each edge of the ribbon a plenum of a protective atmosphere is maintained in the headspace over the bath. This protective atmosphere is usually a reducing atmosphere and penetrates effectively into the wedge-shaped cavity between the ribbon and the bath where the ribbon enters and leaves the bath.

However the exposed surface of the bath may be subjected to oxygen and/or sulphur contamination from traces of oxygen and sulphur which find their way into the headspace over the bath.

The temperature of the bath and of the headspace over the bath at the inlet end of the bath may be of the order of 1000° C., and at this temperature the ribbon of glass achieves, as it is advanced along the bath, a surface brightness at least equal to that obtained by "fire finish" treatment of the glass.

It is a main object of the invention to provide additional protection for the surface of the molten metal bath.

According to the invention a method of manufacturing flat glass during which the glass is supported on a bath of molten metal over which a plenum of protective atmosphere is maintained, is characterised by maintaining on the surface of the bath not engaged by the glass a layer of particulate material which does not react appreciably with either the molten metal or the glass thereby additionally protecting the molten metal of the bath against contamination.

It is though that free oxygen and sulphur may be removed from the headspace at the inlet end of the bath by reduction by the hot reducing atmosphere in the headspace. However at the end of the bath where the ribbon of glass is taken off the bath through an outlet from the bath, the ribbon of glass is sufficiently stiff to enable it to be taken unharmed off the bath by mechanical means, and the temperature of the outlet end of the bath is usually about 600° C. At the lower temperatures experienced in the headspace at the outlet end of the bath any traces of contaminating gases in the atmosphere may not all be readily reduced by the reducing atmosphere.

A further object of the invention is to minimise oxygen and sulphur contamination of the molten metal bath in that part of the bath where oxygen and sulphur may be present in the headspace over the bath despite the reducing atmosphere in the headspace.

From this aspect the invention comprehends in a method of manufacturing flat glass in ribbon form during which the glass is supported on a bath of molten metal over which a plenum of protective atmosphere is maintained and in which the glass ribbon is advanced along the bath towards the outlet end thereof, maintaining on the surface of the bath, at least in the region of the outlet end of the bath, a layer of particulate material which does not react appreciably with either the molten metal or the glass, thereby additionally protecting the molten metal of the bath against contamination.

Further the invention comprises in a method of manufacturing flat glass in ribbon form during which the glass is supported on a bath of molten tin over which a plenum of protective atmosphere is maintained and in which the temperature of the bath is regulated to define a temperature gradient along the bath from the hot end where glass is delivered to the bath to the cold end at which a ribbon of glass is removed from the bath, maintaining on the surface of the bath at least in the region of the cold end of the bath a layer of particulate material which does not react appreciably with either the molten tin or the glass, to additionally protect the surface of that region of the bath from gases in the headspace over the bath.

A preferred particulate material for forming the layer on the bath surface according to the invention is carbon which may be in the form of thin flakes of graphite and forms a layer on the surface of the bath which is substantially impermeable to gases in the headspace. Carbon does not react harmfully with the molten metal of the bath, usually tin, or with the glass which is being advanced along the bath.

A preferred way of operating a process of manufacturing flat glass according to the invention employs, for example, apparatus as described in U.S. Patent No. 2,911,759 in which a bath of molten tin or tin alloy is contained in a tank structure. A plenum of protective atmosphere is maintained in the headspace over the bath. Glass in ribbon form is advanced along the bath of molten tin, and particulate carbon in the form of thin graphite flakes is used to form a layer covering the bath surface not engaged by the ribbon of glass to a depth of about 5 mm. for example.

The layer of carbon particles may extend over the entire exposed bath surface, that is right up to the hot end of the bath and under the glass where it is delivered to the bath.

No appreciable reaction of the carbon occurs with the glass or with the metal of the bath. The reducing atmosphere maintained in the headspace over the bath protects the carbon from burning.

The particulate material is preferably fed on to the bath surface through a hatch chamber communicating with the headspace. Within this chamber a supply of reducing gas is maintained at a plenum to prevent the ingress of ambient atmosphere into the chamber. The particulate material is carried down the bath by the advance of the ribbon of glass, and may be removed from the bath surface through a suitable sealing chamber at the outlet end of the bath. That is the particulate layer is continually replenished, and means may be provided for ensuring that no gaps develop in the layer of particulate material alongside the glass and under the glass at the inlet and discharge ends of the bath.

A particulate layer according to the invention may also be applied to the bath surface in a glass manufacturing process in which glass in molten form is delivered to the bath and is allowed to flow laterally on the bath, without touching the sides of the tank structure containing the bath, to form the ribbon of glass which is subsequently advanced along the bath. The use of carbon particles for coating the bath, even where lateral flow of the glass may be taking place, does not affect or impede the movement of the glass, as the layer is a thin layer which does not hinder the lateral flow of molten glass on the bath, and the carbon does not stick to the glass and is thus enabled to maintain the protective layer on the bath despite changes in the width of the body or ribbon of glass which is advanced along the bath.

Other particulate materials which are suitable for forming the protective layer on the surface of the bath according to the invention, are certain other refractory materials, for example alumina, silica or kieselguhr. Also particulate glass having a high melting point may be employed.

Certain salts may be used with advantage in particulate form to provide a layer according to the invention for additionally protecting the bath surface; for example sodium chloride or potassium chloride. The use of these salts in particulate form is restricted to the cold end of the bath because they do not retain their particulate form at the hot end of the bath. If desired the carbon layer or the layer of other refractory material may be restricted to the cold end of the bath.

The provision of the layer at the cold end of the bath gives in some instances sufficient additional protection for the bath when there are only very slight traces of oxygen and sulphur contaminants in the protective atmosphere over the bath.

The invention also comprehends flat glass in ribbon form produced by the above-described method, and sheets of glass cut from such flat glass.

We claim:

1. In the manufacture of flat glass in ribbon form during which the glass is supported on a bath of molten metal over which a plenum of protective atmosphere is maintained, maintaining on the surface of the bath not engaged by the glass a layer of particulate refractory material which does not react appreciably with either the molten metal or the glass, thereby additionally protecting the molten metal against contamination.

2. A method according to claim 1, wherein the particulate material is carbon.

3. In the manufacture of flat glass during which glass in ribbon form is supported on a bath of molten metal over which a plenum of protective atmosphere is maintained and the glass ribbon is advanced along the bath towards the outlet end thereof, the bath surface being wider than the ribbon of glass, maintaining in particulate form on the exposed surface of the bath alongside the path of travel of the glass ribbon, at least in the region of the outlet end of the bath, a protective layer of particulate material which does not react appreciably with either the molten metal or the glass and does not impede any movement of the glass on the bath, thereby additionally protecting the molten metal of the bath against contamination, said particulate material consisting essentially of a substance or a mixture of substances selected from the group consisting of carbon, alumina, silica, kieselguhr and high melting point glass.

4. A method according to claim 1 wherein the particulate material consists essentially of alumina.

5. A method according to claim 1 wherein the particulate material consists essentially of silica.

6. A method according to claim 1 wherein the particulate material consists essentially of kieselguhr.

References Cited

UNITED STATES PATENTS 2,754,559    7/1956    Fromson _____ 164—81

DONALL H. SYLVESTER, *Primary Examiner.*

A. D. KELLOGG, *Assistant Examiner.*